June 17, 1969 H. J. MALAN 3,450,898
INTEGRATION CIRCUIT
Filed Oct. 31, 1966
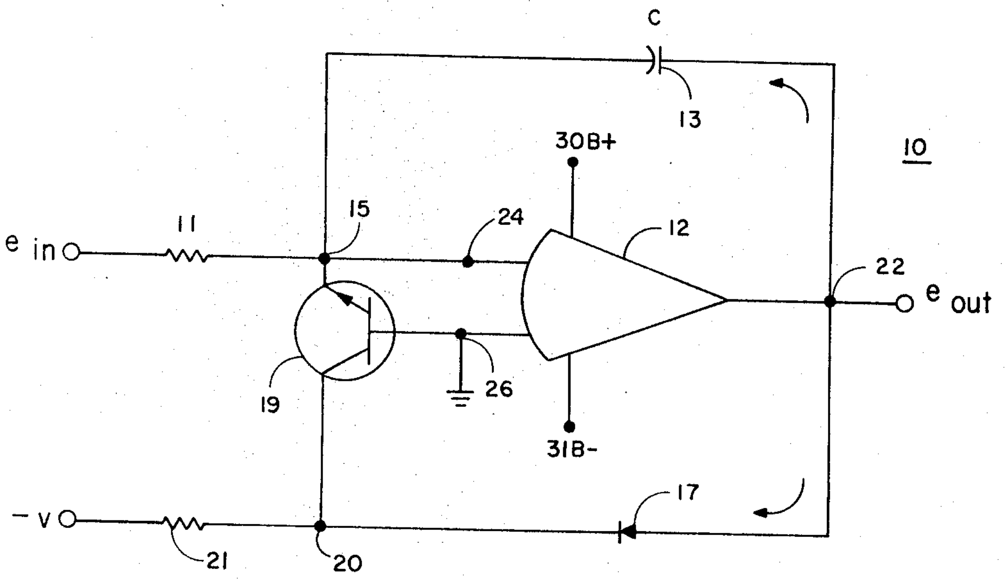
INVENTOR.
HOWARD J. MALAN
BY Raymond L. Owens
ATTY 3,450,898

Patented June 17, 1969

3,450,898

INTEGRATION CIRCUIT

Howard J. Malan, San Diego, Calif., assignor to General Dynamics Corporation, a corporation of Delaware Filed Oct. 31, 1966, Ser. No. 590,625
Int. Cl. G06g 7/12, 7/18; H03k 5/00
U.S. Cl. 307—229 7 Claims The present invention relates to improvements in integration circuits.

Integration circuits have many applications. They are employed in high-precision radar systems, display devices, digital voltmeters, and analog-to-digital converters.

A conventional integration circuit comprises a resistor which couples an input signal to the input of an amplifier and an integration capacitor which shunts the amplifier by being coupled to both its output and input. The output signal from the integration circuit is developed across the integration capacitor.

In many applications it is desirable that the integration circuit be arranged so as to provide but a single polarity output voltage. In order to accomplish this function, many voltage clamping arrangements have been successfully used in the past, but not without disadvantages, among which are instability when subject to temperature variations, stray capacitance which affects the voltage developed across the integration capacitor and difficulties generally associated with complex voltage clamping means.

In view of the foregoing, it is an object of this invention to provide an improved circuit which substantially overcomes the above-indicated disadvantages.

Another object is to provide an improved clamping circuit for use in telemetry, analog computers and other similar applications.

A further object of this invention is to provide a simple but effective clamping arrangement which regulates the output of an integration circuit such that it is capable of providing an output signal of only a single polarity.

Briefly described, a preferred embodiment of the invention which is arranged to develop only a positive polarity output signal makes use of a conventional integration circuit as described above and a particular clamping means for regulating the output of the circuit to insure that it can have only a positive polarity. Preferably, the clamping means includes an NPN transistor which has its emitter connected to the electrical junction of the integration capacitor and input end of the resistor, its collector connected to a source of negative voltage and its base connected to ground or some other reference potential. Also included is a sensing diode, having its anode coupled to the amplifier output and its cathode directly coupled to the collector of the transistor. By means of this arrangement, when the output of the amplifier tends to go below zero volts, the negative voltage bias on the collector will increase to the extent that the transistor will conduct, thereby providing a low impedance path across the amplifier which effectively draws current from the amplifier input, causing the output voltage of the integrator to return to a positive level.

The invention itself, both as to its organization and method of operation, as well as additional objects and advantages of the invention will become more readily apparent from a reading of the following description taken in conjunction with the accompanying drawing which is a block-schematic circuit diagram of a preferred integration circuit in accordance with the present invention.

The drawing depicts an integration circuit 10 which is arranged to provide with respect to ground potential only a positive polarity output voltage $e_{out}$. More particularly the circuit 10 includes a conventional integration arrangement; namely, a resistor 11 which serially connects the input signal $e_{in}$ to an amplifier 12, described in more detail later in the specification. The output of the amplifier 12 is shunted by means of an integration capacitor 13, with the electrical junction of the capacitor 13 and the input end of the resistor 11 being designated by the numeral 15.

With the amplifier 12 referenced to ground potential, the output voltage across the capacitor 13 will assume the following form:

$$e_{out}=\frac{-1}{RC}\int e_{in}dt+V_o$$

wherein $e_{out}$ is the voltage developed across the capacitor 13,
R is the resistance of the resistor 11,
C is the capacitance of the integration capacitor 13, and
$V_o$ represents the initial charge on the capacitor 13.

In accordance with the invention there is provided a sensing diode 17, having its anode coupled to the amplifier output and its cathode directly connected to the collector of an NPN transistor 19. The emitter of the transistor is shown to be connected to the electrical junction 15; the collector is connected at the junction 20 between a current limiting resistor 21 and the diode 17; and the base is connected to reference potential, which in the specific case is shown to be at ground potential, but may also be at some other positive or negative reference level. The resistor 21 is in communication with a stable source of negative voltage (—V), relative to ground potential.

Preferably, the NPN transistor 19 is connected in an inverted manner in that its emitter is biased as if it were a collector, and its collector is biased as if it were an emitter. Accordingly, the transistor 19 will have a relative low shunt capacitance between the emitter and collector electrodes. Moreover, inasmuch as the base of the transistor 19 is at ground potential, the effect of the capacitance between it and the other transistor electrodes does not substantially effect the operation of the integration capacitor 13.

The junction 15 will, of course, assume a slightly negative potential (with reference to ground) when the transistor 19 is conductive, a condition that takes place when the output voltage of the amplifier 12 tends to drop below zero volts. In response to this negative input, the amplifier 12 responds by developing a positive output.

An example of a commercially available operational amplifier well suited to accomplish this purpose is the Model 1503, manufactured by Burr-Brown of Tucson, Ariz. The output, input and reference connection of this amplifier are respectively indicated to be at 22, 24, 26 (ground or some other reference potential level), 30 (B+), and 31 (B—) in the drawing.

In operation, when the output signal $e_{out}$ is positive, the capacitor 13 will feed current back to the junction 15 (assuming the convention that current flows from positive to negative) and the diode 17 will be forward biased and current will flow through it towards the junction 20. At this time, the voltage at junction 20 will not be sufficiently negative to bias the transistor 19 on. When the output $e_{out}$ tends to become negative, the voltage viewed by the collector will become more negative, approaching the value sufficient to turn on the transistor 19. Accordingly, a low impedance path then exists through transistor 19 to the input of amplifier 12, which effectively draws off most of the current from the junction 15. As a result the output $e_{out}$ at 22 of the amplifier 12 will be driven to a more positive polarity. This voltage as communicated through diode 17 will now cause junction 20 to raise to a more positive potential, decreasing the emitter collector current of transistor 19. This action, accordingly, clamps the output $e_{out}$ to a potential very nearly equal to ground potential. When the input $e_{in}$ is such as to drive the output of the amplifier 12 to a more highly positive voltage state, the collector voltage will be increased to a point where the transistor 19 shuts off, normal integrator operation will then exist and the components 19, 17, 21, and voltage (−V) will effectively be out of the circuit.

From the foregoing description it will be apparent that there has been provided an improved integration circuit. The circuit described may be thought of as a negative clamp arrangement in that it will pass only positive output signals. On the other hand, if a positive clamping arrangement is required, a PNP transistor, connected in an inverted fashion, may be substituted for the NPN transistor, and the connection of the diode 17 and polarity of the voltage "V" reversed. Clearly then, variations and modifications of the illustrated integration circuit will undoubtedly become apparent to those skilled in the art. Accordingly, the foregoing description should be taken as illustrative and not in any limiting sense.

What is claimed is:

1. In an integration circuit including a resistor coupled at one end to a variable voltage signal and at its other end in series with an amplifier shunted by a capacitor, the improvement comprising means for preventing the output of the amplifier from changing polarity, including (a) a source of voltage, (b) a transistor coupled between said source of voltage and the input to said amplifier, and (c) a sensing diode connecting the output of said amplifier to the junction point of said transistor and voltage source and being adapted to turn on said transistor when said output voltage tends to change polarity.

2. The invention as set forth in claim 1, wherein said voltage source is at a negative potential and wherein said transistor is of the NPN variety including an emitter coupled to the junction of said resistor and said capacitor, a collector coupled between said voltage source and said sensing diode, and a base connected to a reference voltage level.

3. The invention as set forth in claim 2, including a second resistor coupled between said voltage source and said junction of said diode and said collector.

4. The invention as set forth in claim 2, wherein said diode has its anode coupled to the amplifier output and its cathode coupled to said collector.

5. The invention as set forth in claim 1, wherein said voltage source is at a positive potential and wherein said transistor is of the PNP variety including an emitter coupled to the junction of said resistor and said capacitor, a collector between said voltage source and said sensing diode, and a base connected to a reference voltage level.

6. The invention as set forth in claim 5, including a second resistor coupled between the said voltage source and said junction of said diode and said collector.

7. The invention as set forth in claim 5, wherein said diode has its cathode coupled to the amplifier output and its anode coupled to said collector.

References Cited

UNITED STATES PATENTS 3,364,366 1/1968 Dryden ---------- 328—127 X
3,378,781 4/1968 Hill ------------- 330—110 X DONALD D. FORRER, *Primary Examiner.*

U. S. Cl. X.R.

328—127; 330—110